US012484120B2

(12) United States Patent
Oomori et al.

(10) Patent No.: US 12,484,120 B2
(45) Date of Patent: Nov. 25, 2025

(54) MICROWAVE TREATMENT DEVICE (71) Applicant: Panasonic Intellectual Property Management Co., Ltd., Osaka (JP)

(72) Inventors: Yoshiharu Oomori, Shiga (JP); Daisuke Hosokawa, Shiga (JP); Koji Yoshino, Shiga (JP); Kazuki Maeda, Shiga (JP); Takashi Uno, Shiga (JP); Masayoshi Hiramoto, Tokyo (JP); Fumitaka Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1059 days.

(21) Appl. No.: 17/608,209

(22) PCT Filed: Jul. 28, 2020

(86) PCT No.: PCT/JP2020/028815
§ 371 (c)(1),
(2) Date: Nov. 2, 2021

(87) PCT Pub. No.: WO2021/020373
PCT Pub. Date: Feb. 4, 2021

(65) Prior Publication Data
US 2022/0210877 A1   Jun. 30, 2022

(30) Foreign Application Priority Data
Jul. 31, 2019   (JP) .................. 2019-140412

(51) Int. Cl.
*H05B 6/68*   (2006.01)
*H05B 6/64*   (2006.01)
(52) U.S. Cl.
CPC ........... *H05B 6/686* (2013.01); *H05B 6/6447* (2013.01); *H05B 6/687* (2013.01)

(58) Field of Classification Search
CPC ....... H05B 6/686; H05B 6/6447; H05B 6/687
See application file for complete search history.

(56) References Cited

U.S. PATENT DOCUMENTS

| 2012/0067872 A1 | 3/2012 | Libman et al. |
| 2013/0200065 A1 | 8/2013 | Libman et al. |

(Continued)

FOREIGN PATENT DOCUMENTS

| JP | 56-134491 | 10/1981 |
| JP | 11-083325 | 3/1999 |
| JP | 2008-108491 | 5/2008 |

OTHER PUBLICATIONS

International Search Report of PCT application No. PCT/JP2020/028815 dated Oct. 13, 2020.

(Continued)

*Primary Examiner* — Steven W Crabb
*Assistant Examiner* — Spencer H. Kirkwood
(74) *Attorney, Agent, or Firm* — Wenderoth, Lind & Ponack, L.L.P.

(57) ABSTRACT

A microwave treatment device comprises: a heating chamber that accommodates an object to be heated; a microwave generator that generates a microwave in a specified frequency band; an amplifier that amplifies the microwave; a feeding unit that supplies the amplified microwave to the heating chamber; a detector that detects a reflected microwave power; and a controller. The controller selects one of plural frequencies in the specified frequency band and causes the microwave generator to generate the microwave with the selected frequency. The controller causes the amplifier to change an output power of the microwave so that the microwave supplied to the heating chamber has one of plural output powers. The controller measures a reflected microwave frequency characteristic based on reflected microwave powers detected under each of a condition that the micro- (Continued)

wave has a first output power and a condition that the microwave has a second output power.

13 Claims, 4 Drawing Sheets

(56) References Cited

U.S. PATENT DOCUMENTS

2019/0274196 A1* 9/2019 Guatta .................. H05B 6/50
2023/0024004 A1* 1/2023 Chase .................. H05B 6/688

OTHER PUBLICATIONS

Extended European Search Report issued Sep. 14, 2022 for the related European Patent Application No. 20846184.8.

* cited by examiner

MICROWAVE TREATMENT DEVICE

CROSS-REFERENCE TO RELATED APPLICATIONS

This application is a U.S. national stage application of the PCT International Application No. PCT/JP2020/028815 filed on Jul. 28, 2020, which claims the benefit of foreign priority of Japanese patent application No. 2019-140412 filed on Jul. 31, 2019, the contents all of which are incorporated herein by reference.

TECHNICAL FIELD

The present disclosure relates to a microwave treatment device having a microwave generator.

BACKGROUND ART

Such a conventional microwave treatment device is known that changes the oscillation frequency, the oscillation amplitude level, or the like of a semiconductor oscillator according to the power level of a reflected microwave (see PTL 1, for example). A purpose of this conventional art is to protect an amplifier from the reflected microwave.

Such another convention microwave treatment device is known that detects a reflected microwave power while sweeping the frequency of the microwave before heating a heating target and heats the object using a microwave with a frequency at which the reflected microwave power becomes minimum or local minimum (see PTL 2, for example). Purposes of this conventional art are to improve the power conversion efficiency and to prevent the microwave treatment device from being damaged by the reflected microwave power.

Such another conventional microwave treatment device is known that calculates an average value of difference between the level of the incident microwave power and the level of the reflected microwave power and, when the average value has reached a target average value, causes the microwave heating to be finished or temporarily stopped (see PTL 3, for example). A purpose of this conventional art is to obtain a dried product with a high degree of accuracy.

CITATION LIST

Patent Literature

PTL 1: Unexamined Japanese Patent Publication No. S56-134491
PTL 2: Unexamined Japanese Patent Publication No. 2008-108491
PTL 3: Unexamined Japanese Patent Publication No. H11-83325

SUMMARY OF THE INVENTION

In a microwave treatment device, a microwave absorbed by the walls of the heating chamber exists other than the microwave absorbed by the heating target. The amount of the microwave absorbed by the walls of the heating chamber varies depending on the material of the walls. As the amount of the microwave absorbed by the walls of the heating chamber increases, the detected reflected microwave power decreases. In this case, it is difficult to recognize whether or not the microwave was effectively absorbed by the heating target.

If the degree of microwave absorption by the heating target cannot be recognized from the information of the reflected microwave power, it is difficult to cause the microwave treatment device to operate with a high degree of efficiency. Therefore, an additional component such as a temperature sensor is necessary to recognize the progress of cooking. As a result, the cost of the microwave treatment device increases.

Further, it is difficult to recognize how much amount of microwave was absorbed by the heating target by merely detecting the amount of the incident microwave and the amount of the reflected microwave. Therefore, it is difficult to accurately determine completion of heating the object.

An object of the present disclosure is to provide a microwave treatment device that can accurately recognize the progress of cooking and can appropriately perform cooking a variety of objects.

A microwave treatment device in one aspect of the present disclosure comprises: a heating chamber that accommodates a heating target; a microwave generator that generates a microwave with a frequency in a specified frequency band; an amplifier that amplifies the microwave generated by the microwave generator; a feeding unit that supplies the microwave amplified by the amplifier to the heating chamber; a detector that detects a reflected microwave power returned through the feeding unit; and a controller.

The controller selects one of a plurality of frequencies in the specified frequency band and causes the microwave generator to generate the microwave with the selected frequency. The controller causes the amplifier to change an output power of the microwave so that the microwave supplied to the heating chamber has one of a plurality of output powers. The controller measures a reflected microwave frequency characteristic based on reflected microwave powers detected under each of a condition that the output power of the microwave is a first output power and a condition that the output power of the microwave is a second output power, where the first output power and the second output power are included in the plurality of output powers.

According to the microwave treatment device in this aspect, it is possible to accurately recognizes the progress of cooking and thus possible to appropriately perform cooking.

DESCRIPTION OF EMBODIMENTS

A microwave treatment device in a first aspect of the present disclosure comprises: a heating chamber that accommodates a heating target; a microwave generator that generates a microwave with a frequency in a specified frequency band; an amplifier that amplifies the microwave generated by the microwave generator; a feeding unit that supplies the microwave amplified by the amplifier to the heating chamber; a detector that detects a reflected microwave power returned through the feeding unit; and a controller.

The controller selects one of a plurality of frequencies in the specified frequency band and causes the microwave generator to generate the microwave with the selected frequency. The controller causes the amplifier to change an output power of the microwave so that the microwave supplied to the heating chamber has one of a plurality of output powers. The controller measures a reflected microwave frequency characteristic based on reflected microwave powers detected under each of a condition that the output power of the microwave is a first output power and a condition that the output power of the microwave is a second output power, where the first output power and the second output power are included in the plurality of output powers.

In a microwave treatment device in a second aspect of the present disclosure, which is based on the first aspect, the controller determines a frequency of a microwave that is to be used for cooking based on a first reflected microwave frequency characteristic measured under the condition that the output power of the microwave is the first output power and a second reflected microwave frequency characteristic measured under the condition that the output power of the microwave is the second output power.

In a microwave treatment device in a third aspect of the present disclosure, which is based on the second aspect, the controller selects substantially a same frequency as a frequency of the microwave under each condition that the output power of the microwave is any of the plurality of output powers.

In a microwave treatment device in a fourth aspect of the present disclosure, which is based on the second aspect or the third aspect, the controller causes the microwave generator to generate a microwave while executing a frequency sweep over the specified frequency band.

In a microwave treatment device in a fifth aspect of the present disclosure, which is based on either one of the second to fourth aspects, the controller first measures the first reflected microwave frequency characteristic, and successively measures the second reflected microwave frequency characteristic.

In a microwave treatment device in a sixth aspect of the present disclosure, which is based on either one of the second to fifth aspects, the first output power is lower than 100 W and the second output power is equal to or higher than 100 W.

In a microwave treatment device in a seventh aspect of the present disclosure, which is based on either one of the second to sixth aspects, the controller stores in a storage unit, as an in-chamber loss frequency band, a frequency band in which a difference between the first reflected microwave frequency characteristic and the second reflected microwave frequency characteristic exceeds a predetermined threshold value.

In a microwave treatment device in an eighth aspect of the present disclosure, which is based on the seventh aspect, the controller stores in the storage unit, as a load loss frequency, a frequency at which the reflected microwave frequency characteristic becomes a minimum value or a local minimum value in a frequency band that is excluded from the in-chamber loss frequency band.

In a microwave treatment device in a nineth aspect of the present disclosure, which is based on the eighth aspect, the controller selects the load loss frequency as a frequency of the microwave that is to be used for cooking.

In a microwave treatment device in a tenth aspect of the present disclosure, which is based on the eighth or nineth aspect, the controller stores in the storage unit, as initial values, the first reflected microwave frequency characteristic, the second reflected microwave frequency characteristic, the in-chamber loss frequency band, and the load loss frequency.

In a microwave treatment device in an eleventh aspect of the present disclosure, which is based on the tenth aspect, the controller again measures the first reflected microwave frequency characteristic and the second reflected microwave frequency characteristic halfway through cooking, and updates the initial values stored in the storage unit.

In a microwave treatment device in a twelfth aspect of the present disclosure, which is based on either one of the seventh to eleventh aspects, the controller weights a detection value of the reflected microwave power in a case of using the reflected microwave frequency characteristic in the in-chamber loss frequency band for determining the progress of cooking.

In a microwave treatment device in a thirteenth aspect of the present disclosure, which is based on either one of the second to twelfth aspects, the controller measures the first reflected microwave frequency characteristic and the second reflected microwave frequency characteristic within five minutes after a start of cooking.

Hereinafter, a microwave treatment device according to an exemplary embodiment of the present disclosure will be described with reference to the drawings.

Figure 1:
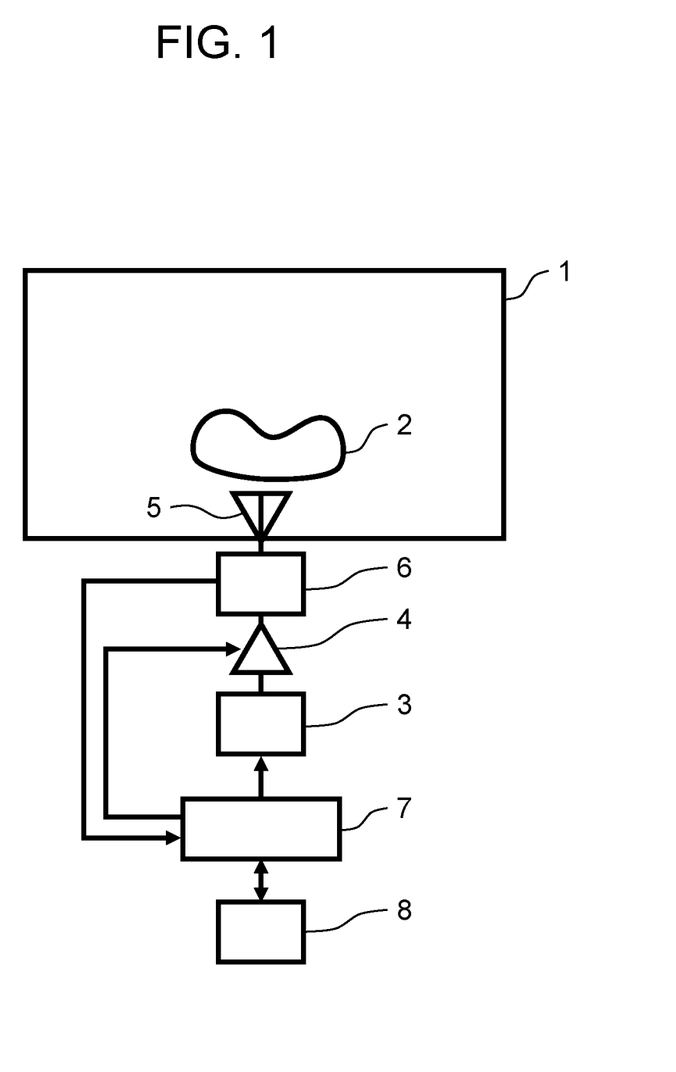
FIG. 1 is a diagram schematically illustrating a configuration of a microwave treatment device according to an exemplary embodiment of the present disclosure.

FIG. 1 is a diagram schematically illustrating a configuration of a microwave treatment device according to the present exemplary embodiment. As shown in FIG. 1, a microwave treatment device according to the present exemplary embodiment comprises heating chamber 1, microwave generator 3, amplifier 4, feeding unit 5, detector 6, controller 7, and storage unit 8.

Heating chamber 1 accommodates heating target 2 heating target 2, which is a load. Microwave generator 3 is configured, for example, by a semiconductor oscillator or the like. Microwave generator 3 can generate a microwave with an arbitrary frequency in a specific frequency band and generates a microwave with a frequency selected by controller 7.

Amplifier 4 is configured, for example, by a semiconductor element. Amplifier 4 amplifies the microwave generated by microwave generator 3 according to an instruction by controller 7 to output a microwave having any one of a plurality of output powers.

Feeding unit 5 is configured by an antenna and supplies the microwave amplified by amplifier 4 to heating chamber 1 as an incident microwave power. A part of the incident microwave power which has not been consumed by heating target 2 or the like becomes a reflected microwave power that is returned from heating chamber 1 through feeding unit 5 to amplifier 4.

Detector 6 is configured by, for example, a directional coupler. Detector 6 detects the incident microwave power and the reflected microwave power and informs controller 7 of the levels of the detected incident microwave power and the detected reflected microwave power. In other words, detector 6 functions as both an incident microwave power detector and a reflected microwave power detector. Storage unit 8 is configured, for example, by a memory device and stores data sent from controller 7. Also, storage unit 8 reads out the stored data and sends the read-out data to controller 7.

Controller 7 is configured by a microcomputer having an on-board central processing unit (CPU). Controller 7 controls microwave generator 3 and amplifier 4 based on information from detector 6 and storage unit 8 to execute a cooking control in the microwave treatment device.

Each of FIGS. 2A to 2D shows frequency characteristics of the reflected microwave powers in the present exemplary embodiment. The electric power consumed by heating target 2, the power loss at the enamel structure in heating chamber 1, and resonance in heating chamber 1 vary depending on the frequency. In other words, the reflected microwave power varies depending on the kind of heating target 2, the material of the walls of heating chamber 1, and the frequency of the microwave. The changes in these conditions cause changes in the level of the loss power of the microwave in heating chamber 1, which in turn cause changes in the level of the reflected microwave power.

In the present exemplary embodiment, what we refer to as the frequency characteristic of the reflected microwave power (the reflected microwave frequency characteristic 11) is a graph showing the change of the reflected microwave power with the frequency obtained by plotting the levels of reflected microwave powers at different frequencies on a coordinate plane with a horizontal axis representing the frequency and a vertical axis representing the level of the reflected microwave power. The level of the reflected microwave power of the vertical axis is represented by a ratio of the reflected microwave power to the incident microwave power. Each of FIGS. 2A to 2D shows measurement results under conditions that the incident microwave power was set to 25 W (solid line), 100 W (dotted line), and 250 W (dashed line).

The lower and higher incident microwave powers may not be limited to the above-mentioned respective values of 25 W and 250 W. The incident microwave power may not be 25 W. The incident microwave power may be lower than 100 W, and may preferably be lower than 50 W. The incident microwave power may not be 250 W. The incident microwave power may be equal to or higher than 100 W, and may preferably be equal to or higher than 200 W.

Figure 2A:
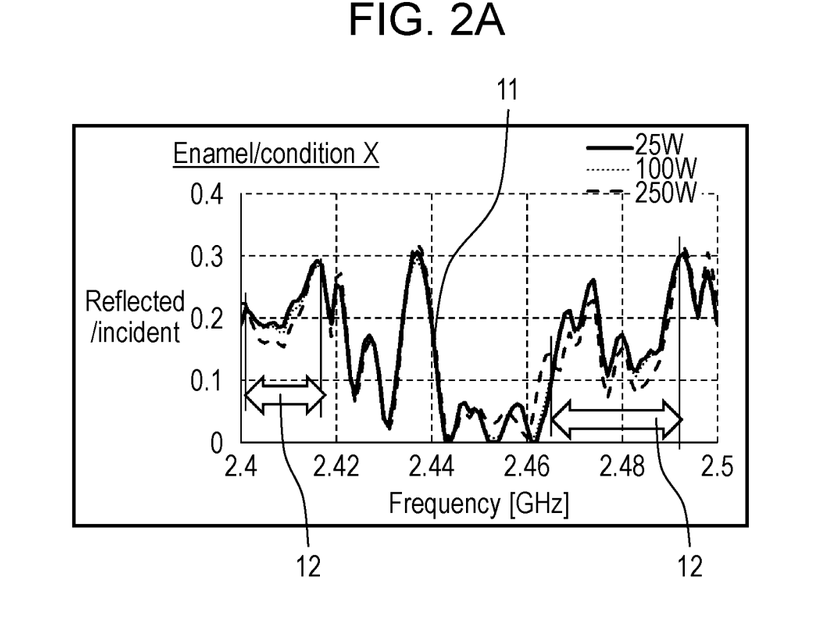
FIG. 2A is a diagram showing frequency characteristics of reflected microwave powers in the present exemplary embodiment.
Figure 2B:
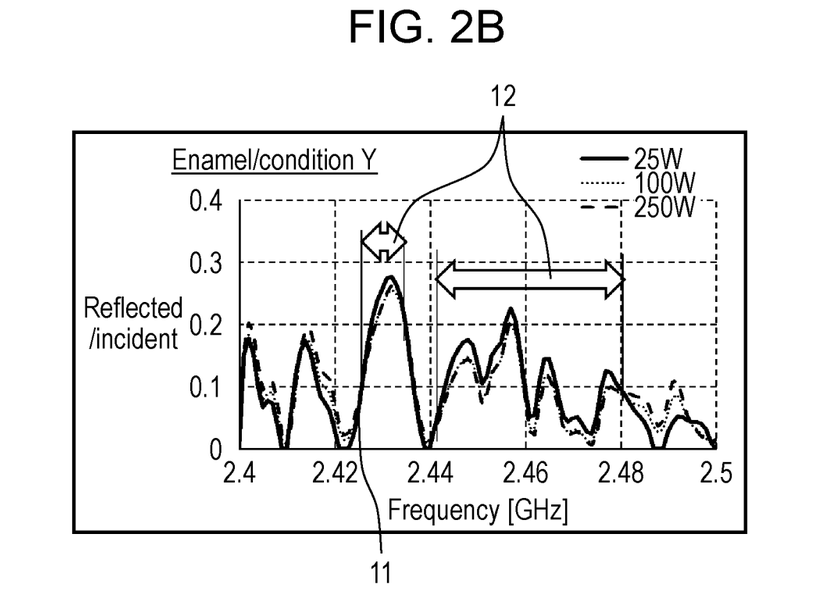
FIG. 2B is a diagram showing frequency characteristics of reflected microwave powers in the present exemplary embodiment.
Figure 2C:
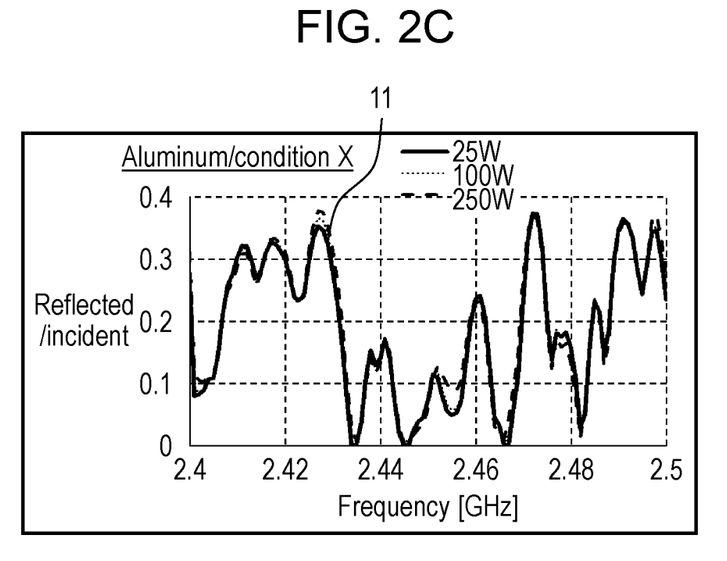
FIG. 2C is a diagram showing frequency characteristics of reflected microwave powers in the present exemplary embodiment.
Figure 2D:
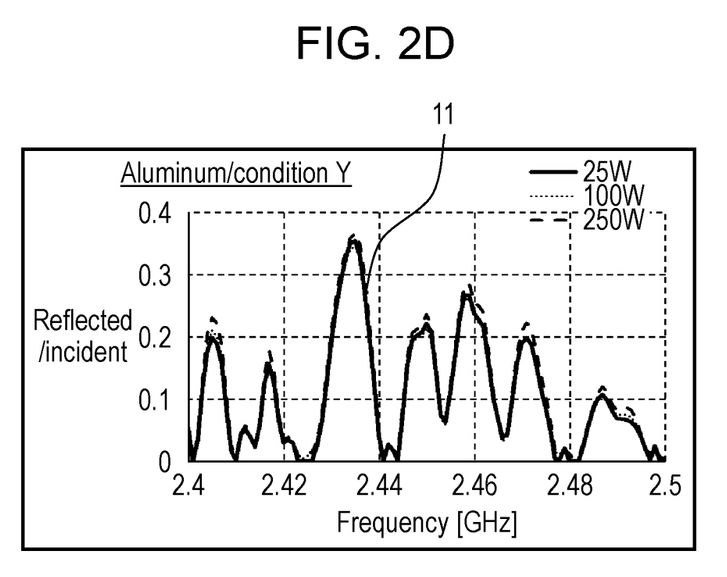
FIG. 2D is a diagram showing frequency characteristics of reflected microwave powers in the present exemplary embodiment.

FIG. 2A and FIG. 2B are different from each other in the load condition in heating chamber 1. Similarly, FIG. 2C and FIG. 2D are different from each other in the load condition in heating chamber 1. The load condition in heating chamber 1 includes the kind and the volume of heating target 2 accommodated in heating chamber 1. In the examples shown in FIGS. 2A and 2C, the load condition in heating chamber 1 is condition X. In the examples shown in FIGS. 2B and 2D, the load condition in heating chamber 1 is condition Y.

Each of FIGS. 2A and 2B shows reflected microwave frequency characteristics 11 in a case where the walls of heating chamber 1 are made of enamel. Enamel is a material produced by fusing a glass graze containing silicon dioxide as a main ingredient onto a surface of a metallic material made of iron, aluminum, or the like in a high temperature atmosphere.

Each of FIGS. 2C and 2D shows reflected microwave frequency characteristics 11 in a case where the walls made of enamel in heating chamber 1 are covered with aluminum tapes to decrease the power loss caused by enamel. Comparing FIG. 2A and FIG. 2C or FIG. 2B and FIG. 2D, it is found that the power loss (absorption of the power) is much larger in the case of heating chamber 1 having the walls made of enamel than in the case of heating chamber 1 having the walls made of aluminum.

Referring to FIGS. 2A and 2B, which shows the case where the walls of heating chamber 1 are made of enamel, there exists a frequency band in which reflected microwave frequency characteristic 11 changes depending on the incident microwave power. In the case where the incident microwave power is 250 W (indicated by the dashed line), there exists a frequency band in which the reflected microwave power is smaller than that in the cases of the other incident microwave powers. In such frequency band, the power loss in heating chamber 1 is larger than that in the other frequency bands.

As in this example, it is possible to recognize a frequency band in which the power loss in heating chamber 1 is larger than a predetermined threshold value and a frequency band in which the power loss in heating chamber 1 is smaller than the predetermined threshold value by comparing reflected microwave frequency characteristic 11 detected in the case of supplying a lower power microwave to heating chamber 1 and reflected microwave frequency characteristic 11 detected in the case of supplying a higher power microwave to heating chamber 1. In the present exemplary embodiment, the frequency band in which the power loss in heating chamber 1 is larger than the predetermined threshold value is referred to as in-chamber loss frequency band 12.

In the example shown in FIG. 2A, in-chamber loss frequency bands 12 are the frequency band from around 2.40 GHz to around 2.42 GHz and the frequency band from around 2.46 GHz to around 2.50 GHz. In the example shown in FIG. 2B, in-chamber loss frequency bands 12 are the frequency band around 2.43 GHz and the frequency band from around 2.44 GHz to around 2.48 GHz.

In the examples shown in FIGS. 2C and 2D, almost no difference depending on the difference in the level of the incident microwave power is seen in reflected microwave frequency characteristics 11. Therefore, it is found that the amount of the power loss depends on the material of the walls of heating chamber 1. This knowledge can be applied not only to the difference in the material of the walls of heating chamber 1 but also to differences in a variety of materials of other parts.

The frequency characteristic in the case where the incident microwave power is 100 W (dotted line) includes a part overlapping with the frequency characteristic in the case where the incident microwave power is 25 W (solid line) and a part overlapping with the frequency characteristic in the case where the incident microwave power is 250 W (dashed line). In other words, the incident microwave power of 100 W is a border between the case where the loss caused by the material of the walls of heating chamber 1 is smaller and the case where the loss caused by the material of the walls of heating chamber 1 is larger. Therefore, it is possible to clearly recognize the power loss in heating chamber 1 by selecting a lower incident microwave power and a higher incident microwave power than the output power of 100 W as a border and changing the output power to the selected incident microwave powers.

Figure 3A:
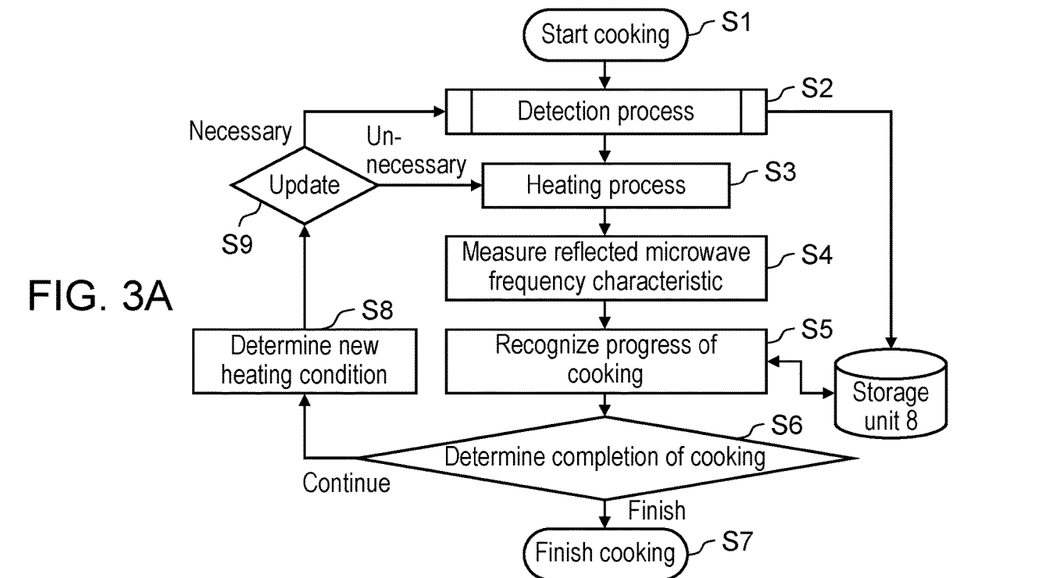
FIG. 3A is a flowchart showing a cooking control flow according to the present exemplary embodiment.

FIG. 3A is a flowchart showing a cooking control flow in the microwave treatment device according to the present exemplary embodiment. In response to a user's operation instructing the microwave treatment device to start cooking (step S1), controller 7 first executes a detection step (step S2).

Figure 3B:
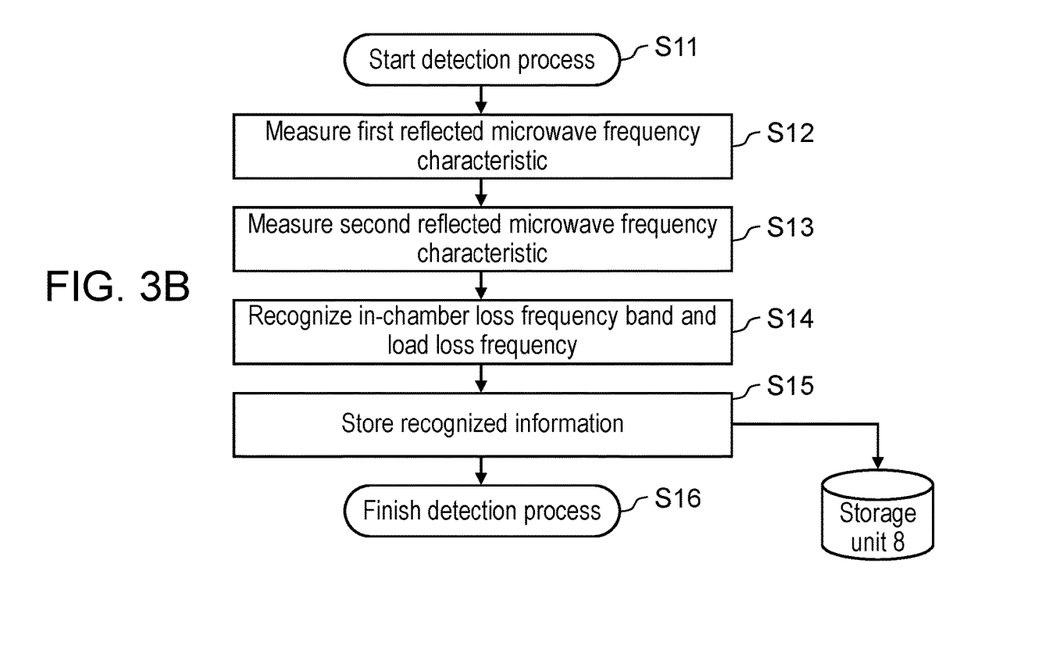
FIG. 3B is a flowchart showing in detail a process of detecting a reflected microwave power according to the present exemplary embodiment.

FIG. 3B is a flowchart showing details of the detection step (step S2). When the detection step has started (step S11), microwave generator 3 generates a microwave while sequentially changing the frequency of the microwave at predetermined frequency intervals over a specified frequency band (e.g., 2.40 GHz to 2.50 GHz). Hereinafter, the operation of sequentially changing the frequency at predetermined frequency intervals over the specified frequency band will be referred to as a frequency sweep.

While microwave generator 3 generates the microwave while executing the frequency sweep, amplifier 4 outputs a low-power incident microwave power (e.g., 25 W), and detector 6 detects a reflected microwave power at each frequency. Controller 7 measures reflected microwave frequency characteristic 11 with respect to the low-power microwave based on the detected reflected microwave powers (step S12). Successively, while the frequency sweep is executed, a high-power incident microwave power (e.g., 250 W) is supplied to heating chamber 1 and reflected microwave frequency characteristic 11 with respect to the high-power microwave is measured (step S13).

In other words, reflected microwave frequency characteristic 11 is measured under a condition that the output power of the microwave is a first output power among a plurality of output powers (step S12), and, successively, reflected microwave frequency characteristic 11 is measured under a condition that the output power of the microwave is a second output power among the plurality of output powers (step S13).

In the present exemplary embodiment, the first output power is a low power (e.g., 25 W), and reflected microwave frequency characteristic 11 measured under this output power condition is first reflected microwave frequency characteristic 11a. The second output power is a high power (e.g., 250 W), and reflected microwave frequency characteristic 11 measured under this output power condition is second reflected microwave frequency characteristic 11b.

The processes in steps S12 and S13 are executed within, for example, five minutes from the start of cooking. In this manner, it is possible to measure reflected microwave frequency characteristic 11 under the stable measurement conditions before the temperatures of heating chamber 1 and heating target 2 largely rise by being heated.

Controller 7 may not execute the frequency sweep to change the frequency at predetermined frequency intervals over the specified frequency band. Instead, controller 7 may select a plurality of frequencies in the specified frequency band. Controller 7 may select substantially the same frequency as the frequency of the microwave under each condition that the output power of the microwave is any of the two kinds of output powers.

Controller 7 compares the two reflected microwave frequency characteristics 11 that have been detected by setting the output power of the microwave to the two kinds of output powers and recognizes a frequency band in which the difference between the two reflected microwave frequency characteristics 11 is larger than the predetermined threshold value as in-chamber loss frequency band 12 (step S14).

As described above, in the example shown in FIG. 2A, in-chamber loss frequency band 12 is the band from around 2.40 GHz to around 2.42 GHz and the band from around 2.46 GHz to around 2.50 GHz. In the example shown in FIG. 2B, in-chamber loss frequency band 12 is the band around 2.43 GHz and the band from around 2.44 GHz to around 2.48 GHz.

In the frequency bands excluding in-chamber loss frequency bands 12, the loss at a frequency at which reflected microwave frequency characteristic 11 becomes a minimum value or a local minimum value is a loss (absorption) caused by parts other than the walls of heating chamber 1 and most of this loss (absorption) is caused by the heating target. Controller 7 recognizes this frequency as the load loss frequency (step S14).

Controller 7 stores reflected microwave frequency characteristics 11, in-chamber loss frequency bands 12, and the load loss frequencies with respect to the low-power and high-power microwaves in storage unit 8 as initial values (step S15) and finishes the detection step (step S16). The processing flow returns to FIG. 3A to heat heating target 2 by the microwave heating or the like (step S3).

The in-chamber loss can be reduced by supplying the microwave with the load loss frequency obtained in step S2. In other words, the microwave with the load loss frequency is absorbed mainly by heating target 2, so that highly efficient cooking can be performed.

Next, the microwave treatment device supplies the microwave having the output power that is to be used for cooking while executing the frequency sweep. Based on the reflected microwave powers detected in this operation, reflected microwave frequency characteristic 11 with respect to the microwave having the output power that is to be used for cooking is measured (step S4). Controller 7 compares the information obtained in step S4 to the above-described initial values to recognize the progress of cooking based on the change from the initial values to the obtained information (step S5).

In in-chamber loss frequency band 12, the power loss in heating chamber 1 includes losses caused by the structures of heating chamber 1 such, for example, as the material of the walls of heating chamber 1, and the detected values of the reflected microwave power change depending on the output power. Therefore, the detected values of the reflected microwave power are weighted so that the condition of the output power becomes the same as that used to obtain the initial values to be compared.

Controller 7 determines whether or not cooking has been completed based on the recognized progress of cooking (step S6). If the result of the progress determination is completion of cooking, controller 7 causes the cooking process to be finished (step S7). Otherwise, controller 7 causes the cooking process to be continued, and determines a new heating condition as needed (step S8).

Controller 7 determines whether or not it is necessary to update the initial values for the reason that a long time has passed after the start of cooking or for the reason that the heating condition has changed (step S9). If update of the initial values is necessary, the processing flow goes to the detection step (step S2). Otherwise, the processing flow goes to heating process (step S3).

As described hereinabove, the microwave treatment device according to the present exemplary embodiment supplies a high-power microwave and a low-power microwave to heating chamber 1 at the time of starting cooking and measures reflected microwave frequency characteristics 11 with respect to the low-power microwave and the high-power microwave. Based on a difference between the two reflected microwave frequency characteristics 11, the microwave treatment device according to the present exemplary embodiment recognizes in-chamber loss frequency band 12 in which the in-chamber loss is large and a load loss frequency at which heating target 2 mainly absorbs the microwave.

The microwave treatment device according to the present exemplary embodiment can accurately recognizes the frequency at which the microwave is efficiently absorbed by heating target 2 and the change in the frequency based on reflected microwave frequency characteristic 11, in-chamber loss frequency 12, and the load loss frequency.

Controller 7 may use reflected microwave frequency characteristic 11 obtained by weighting the detected values of the reflected microwave power in in-chamber loss frequency band 12 in addition to reflected microwave frequency characteristic 11 in a frequency band excluding in-chamber loss frequency band 12 to estimate the progress of cooking. This makes it possible to use wider range of information to determine the progress of cooking, so that it is possible to accurately recognize the progress of cooking with respect to a variety of objects which are to be heated.

The microwave treatment device according to the present exemplary embodiment measures reflected microwave frequency characteristics 11 with respect to the low-power microwave and the high-power microwave again halfway through cooking and updates the initial values stored in storage unit 8. This makes it possible to perform appropriate cooking even in a case where the position of heating target 2 is deviated due to puffing or the like of heating target 2.

INDUSTRIAL APPLICABILITY

The microwave treatment device according to the present disclosure is applicable not only to microwave ovens, but also to industrial-use microwave heating equipment including, for example, drying machines, pottery kilns, waste disposers, semiconductor manufacturing equipment, and chemical reactors.

REFERENCE MARKS IN THE DRAWINGS

1 heating chamber
2 object to be heated
3 microwave generator
4 amplifier
5 feeding unit
6 detector
7 controller
8 storage unit
11 reflected microwave frequency characteristic
11a first reflected microwave frequency characteristic
11b second reflected microwave frequency characteristic
12 in-chamber loss frequency band

The invention claimed is:

1. A microwave treatment device comprising:
a heating chamber configured to accommodate a heating target;
a microwave generator configured to generate a microwave with a frequency in a specified frequency band;
an amplifier configured to amplify the microwave generated by the microwave generator;
a feeding unit configured to supply the microwave amplified by the amplifier to the heating chamber;
a detector configured to detect a reflected microwave power returned through the feeding unit; and
a controller configured to control the microwave generator and the amplifier,
wherein the controller selects one of a plurality of frequencies in the specified frequency band and causes the microwave generator to generate the microwave with the selected frequency,
the controller causes the amplifier to change an output power of the microwave so that the microwave supplied to the heating chamber has one of a plurality of output powers,
the controller measures a reflected microwave frequency characteristic based on reflected microwave powers detected under each of a condition that the output power of the microwave is a first output power and a condition that the output power of the microwave is a second output power, where the first output power and the second output power are included in the plurality of output powers and the first output power is a lower power than the second output power, and
the controller determines an in-chamber loss frequency band based on a first reflected microwave frequency characteristic measured under the condition that the output power of the microwave is the first output power and a second reflected microwave frequency characteristic measured under the condition that the output power of the microwave is the second output power.

2. The microwave treatment device according to claim 1, wherein the controller is configured to determine a frequency of a microwave that is to be used for cooking based on a first reflected microwave frequency characteristic measured under the condition that the output power of the microwave is the first output power and a second reflected microwave frequency characteristic measured under the condition that the output power of the microwave is the second output power.

3. The microwave treatment device according to claim 2, wherein the controller is configured to select a same frequency as a frequency of the microwave under each condition that the output power of the microwave is any of the plurality of output powers.

4. The microwave treatment device according to claim 2, wherein the controller is configured to cause the microwave generator to generate the microwave while executing a frequency sweep over the specified frequency band.

5. The microwave treatment device according to claim 2, wherein the controller is configured to first measure the first reflected microwave frequency characteristic, and successively measure the second reflected microwave frequency characteristic.

6. The microwave treatment device according to claim 2, wherein the first output power is lower than 100 W and the second output power is equal to or higher than 100 W.

7. The microwave treatment device according to claim 2, wherein the controller is configured to measure the first reflected microwave frequency characteristic and the second reflected microwave frequency characteristic within five minutes after a start of cooking.

8. The microwave treatment device according to claim 2, wherein the controller is configured to store in a storage unit, as an in-chamber loss frequency band, a frequency band in which a difference between the first reflected microwave frequency characteristic and the second reflected microwave frequency characteristic exceeds a predetermined threshold value.

9. The microwave treatment device according to claim 8, wherein the controller is configured to store in the storage unit, as the load loss frequency, a frequency at which the reflected microwave frequency characteristic becomes the minimum value or a local minimum value in the frequency band that is excluded from the in-chamber loss frequency band.

10. The microwave treatment device according to claim 9, wherein the controller is configured to select the load loss frequency as a frequency of the microwave that is to be used for cooking.

11. The microwave treatment device according to claim 9, wherein the controller is configured to store in the storage unit, as initial values, the first reflected microwave frequency characteristic, the second reflected microwave frequency characteristic, the in-chamber loss frequency band, and the load loss frequency.

12. The microwave treatment device according to claim 11, wherein the controller is configured to measure again the first reflected microwave frequency characteristic and the second reflected microwave frequency characteristic halfway through cooking, and to update the initial values stored in the storage unit.

13. The microwave treatment device according to claim 8, wherein the controller is configured to weight a detection value of the reflected microwave power in a case of using the reflected microwave frequency characteristic in the in-chamber loss frequency band for determining progress of cooking.

\* \* \* \* \*